UNITED STATES PATENT OFFICE.

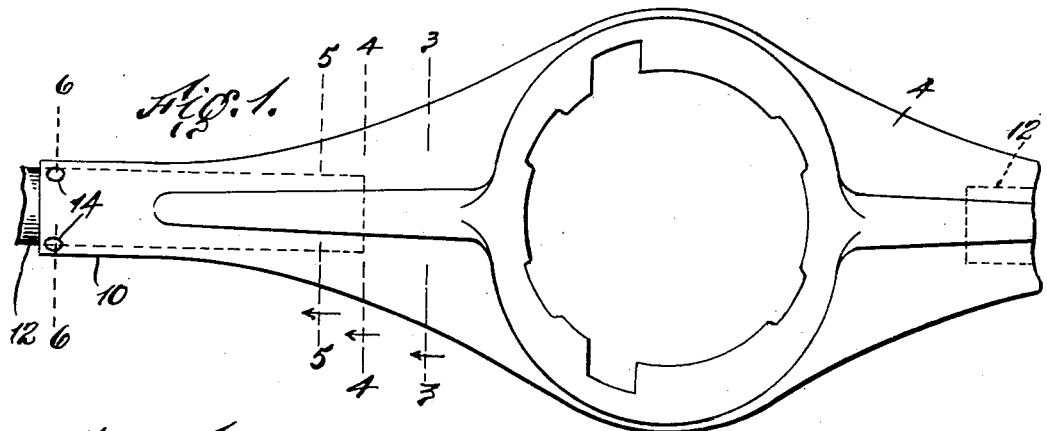
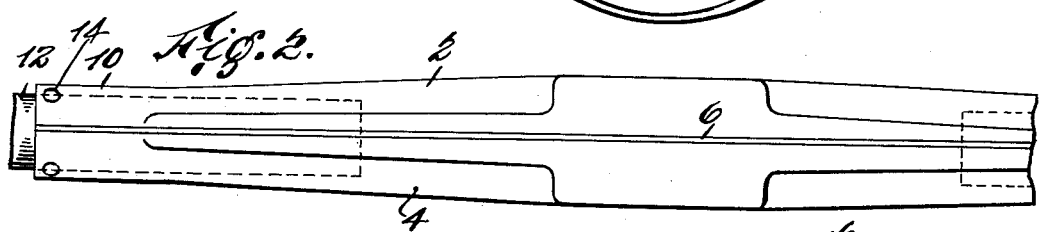
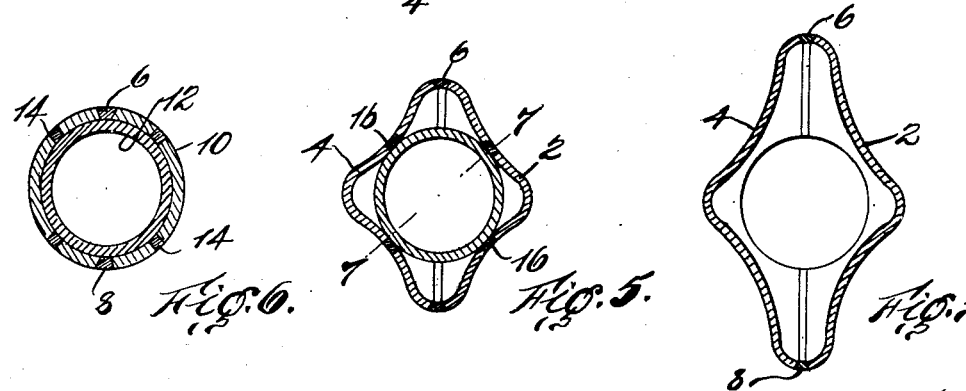
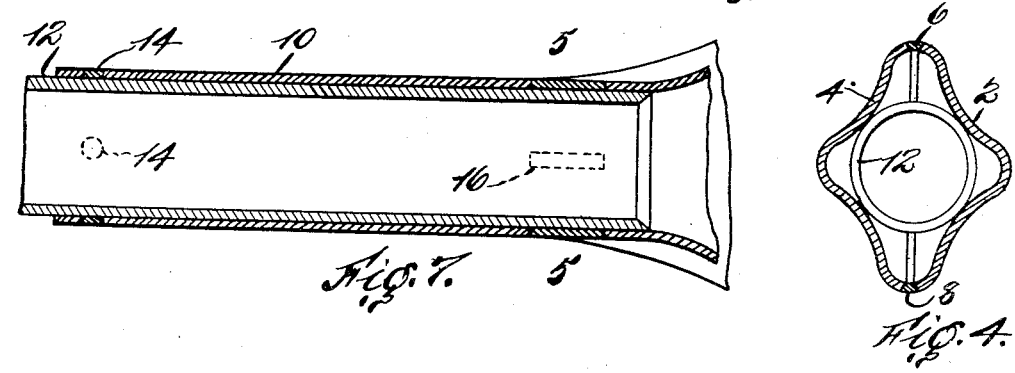

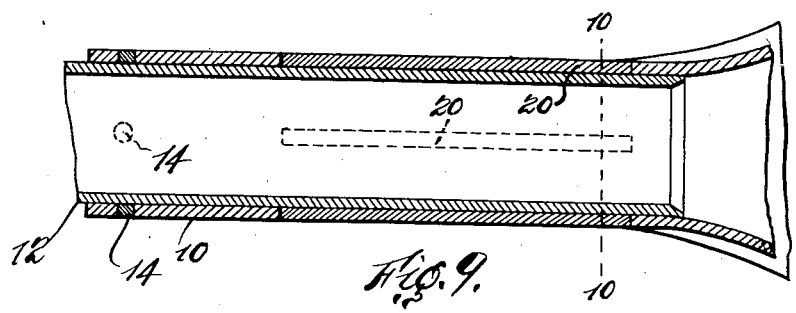
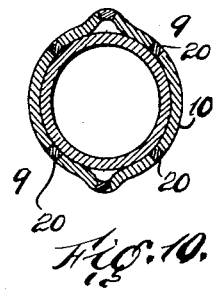
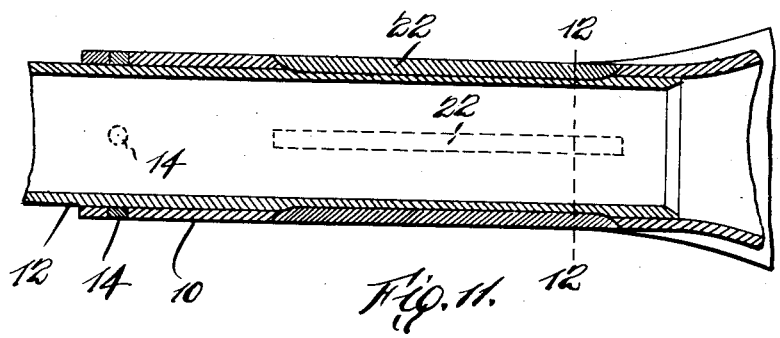
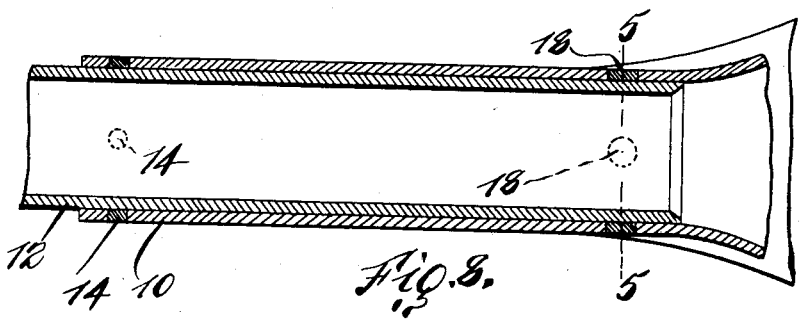

RUSSELL HUFF, OF DETROIT, MICHIGAN, ASSIGNOR TO DODGE BROTHERS, OF DETROIT, MICHIGAN, A CORPORATION OF MICHIGAN.

REAR-AXLE HOUSING.

1,403,500.   Specification of Letters Patent.   Patented Jan. 17, 1922.

Application filed April 2, 1920. Serial No. 370,703.

*To all whom it may concern:*

Be it known that I, RUSSELL HUFF, a citizen of the United States, residing at Detroit, Michigan, have invented certain new and useful Improvements in Rear-Axle Housings, of which the following is a clear, full, and exact description.

This invention relates to axle housings for motor vehicles, and a general object of the invention is to improve and strengthen and to facilitate the manufacture of axle housings of the general type of that shown and described in United States Letters Patent #1,209,134 to J. F. and H. E. Dodge, granted December 19, 1916.

Other objects and important features of the invention will appear from the following description and claims when considered in connection with the accompanying drawings, in which—

Fig. 1 is an elevation, partly broken away, of an axle housing embodying the present invention;

Fig. 2 is a plan view of the structure shown in Fig. 1;

Figs. 3, 4, 5 and 6 are sections respectively on the lines 3—3, 4—4, 5—5 and 6—6 of Fig. 1;

Fig. 7 is a longitudinal section on the line 7—7 of Fig. 5;

Fig. 8 is a section similar to Fig. 7, but showing a modification of the shape of the openings through which the welding of the housing to the tubular extension is effected;

Fig. 9 is a section similar to Figs. 7 and 8, showing another modification of the shape of the welding openings;

Fig. 10 is a section on the line 10—10 of Fig. 9;

Fig. 11 is a section on the line 11—11 of Fig. 12, showing a further modification of the manner of welding the housing to its tubular extension; and Fig. 12 is a section on the line 12—12 of Fig. 11.

The axle housing in which the structural features of the present invention are embodied and in the manufacture of which the novel process which constitutes a part of the present invention is practiced, is of the general form of that shown and described in the Letters Patent above identified, and comprises an intermediate portion formed of stamped halves 2 and 4 connected by top and bottom welds 6 and 8, the halves 2 and 4 being substantially alike. Like the axle housing of the Letters Patent above identified, the intermediate part of the housing of the present invention is provided with longitudinal corrugations which are deepest and most marked in the region of the central enlargement of the housing, this enlargement forming a part of the differential chamber. These corrugations gradually become shallower toward the ends of the intermediate portion of the housing and these ends, as shown at 10 in Figs. 1 and 2 and by the cross-section in Fig. 6, are preferably cylindrical in section and are preferably bored out cylindrically or otherwise provided with cylindrical openings to receive the tubular extensions 12 of the housing. Moreover, in the present construction, the corrugated part of the housing is preferably so shaped that the depressions between the ribs of the corrugations contact with those portions of the tubular extensions 12 of the housing which extend into the housing throughout the range of the overlap of these parts, which overlap is greater than the free portions of the tubular extensions, thus providing substantial support for the tubular parts of the housing against lateral strains even up to the inner ends of these tubular parts as shown by the section in Fig. 4 of the drawings, which is on the line 4—4 of Fig. 1, this section cutting the housing in the plane of the inner end of one of the tubular extensions 12.

In order to secure the tubular extensions 12 of the housing permanently in assembled relation to the intermediate portion of the housing, the present invention provides for welding these parts together after they are assembled. In the form of the invention shown in Figs. 1 to 10 inclusive, openings through which the welding may be effected are preferably punched through the halves 2 and 4 of the intermediate part of the housing before these halves are welded together. In the form of the invention illustrated in Figs. 11 and 12, some of the openings are preferably formed by milling slots through the intermediate part of the housing after the halves 2 and 4 have been welded together and the tubular extensions inserted in the cylindrical ends of the intermediate part.

In Figs. 1 to 7 inclusive of the drawings, the intermediate part of the housing is shown as provided in its cylindrical ends with circular openings 14 through which the welding of the intermediate part of the tubular extensions may be effected in any suitable manner, as for example by the electric arc or the oxy-acetylene process, the weld preferably filling the hole, as shown in each of the figures, and restoring the original surface of the housing. In this form of the invention, the intermediate part of the housing is preferably also provided with rectangular or elongated slots 16 in the depressions between the corrugations which contact with the tube 12, these slots preferably being located near the inner ends of the tubular extensions 12, as shown in Fig. 7 of the drawings, and the housing being welded to the extensions 12 through the slots 16 in the same manner as through the circular openings 14.

In Fig. 8 is shown a modification in which, in place of the rectangular or elongated slots 16 between the corrugations, there are provided circular openings 18 similar to those in the cylindrical part 10 of the intermediate part of the housing, but preferably somewhat larger than the circular openings 14.

In Fig. 9 the elongated slots 20, similar to those in Fig. 7, are shown as extending throughout a substantial part of the overlap of the housing and tubular extension. In fact, as shown by the section in Fig. 10, the weld in this modification extends from the depressions between the corrugations a considerable distance into the cylindrical part of the housing.

In Figs. 11 and 12, as hereinabove suggested, the slot 22, through which the welding of the housing to the inner end of the tubular extensions 12 is effected, is preferably milled through the housing after the tube and housing are assembled, and the milling is preferably extended into the tubular extension a short distance, as is shown by the sections in Figs. 11 and 12. The milled slot 22 is also preferably somewhat V-shaped in cross-section, as shown in Fig. 12.

In the preferred method of carrying out the invention, after the intermediate protion of the housing has been assembled by welding the halves 2 and 4 together, the interiors of the cylindrical ends 10 are preferably bored out to the size of the tubular extensions 12 to make a nice fit when the tubes are inserted in these ends, this step being of equal utility whether the welding openings are formed in the halves before the halves are assembled, or are milled in the housing after assembling as shown in Figs. 11 and 12. After boring out the ends, the tubular extensions 12 are inserted in these ends, and the welding through the slots and circular openings is effected in any suitable manner as above suggested.

From the foregoing description, it will be seen that the resultant housing is an integral or one-pieced structure of great stiffness, and that the prcess by which it is produced facilitates its standardized manufacture.

What I claim as new is:

1. An axle housing, comprising an intermediate longitudinally corrugated member tapered to cylindrical ends and tubes extending through said cylindrical ends into the corrugated parts of said intermediate member to within a short distance of the center thereof so that the overlapping portions exceed the free portions of the tubes and each having contact with said member throughout the lengths of the overlapping portions, said parts being connected by longitudinally arranged, peripherally spaced welds.

2. An axle housing, comprising an intermediate longitudinally corrugated member having cylindrical ends, tubular extensions fitted into said cylindrical ends and extending into the corrugated parts of said member and contacting with corrugations thereof to the inner ends of said tubes, said tubes and said intermediate member overlapping for a greater portion of the length of the tubes being welded together through openings in the corrugations which contact with said tubes.

Signed at Detroit, this 25th day of March, 1920.

RUSSELL HUFF.

Witness:
JOHN R. FURSE.